UNITED STATES PATENT OFFICE.

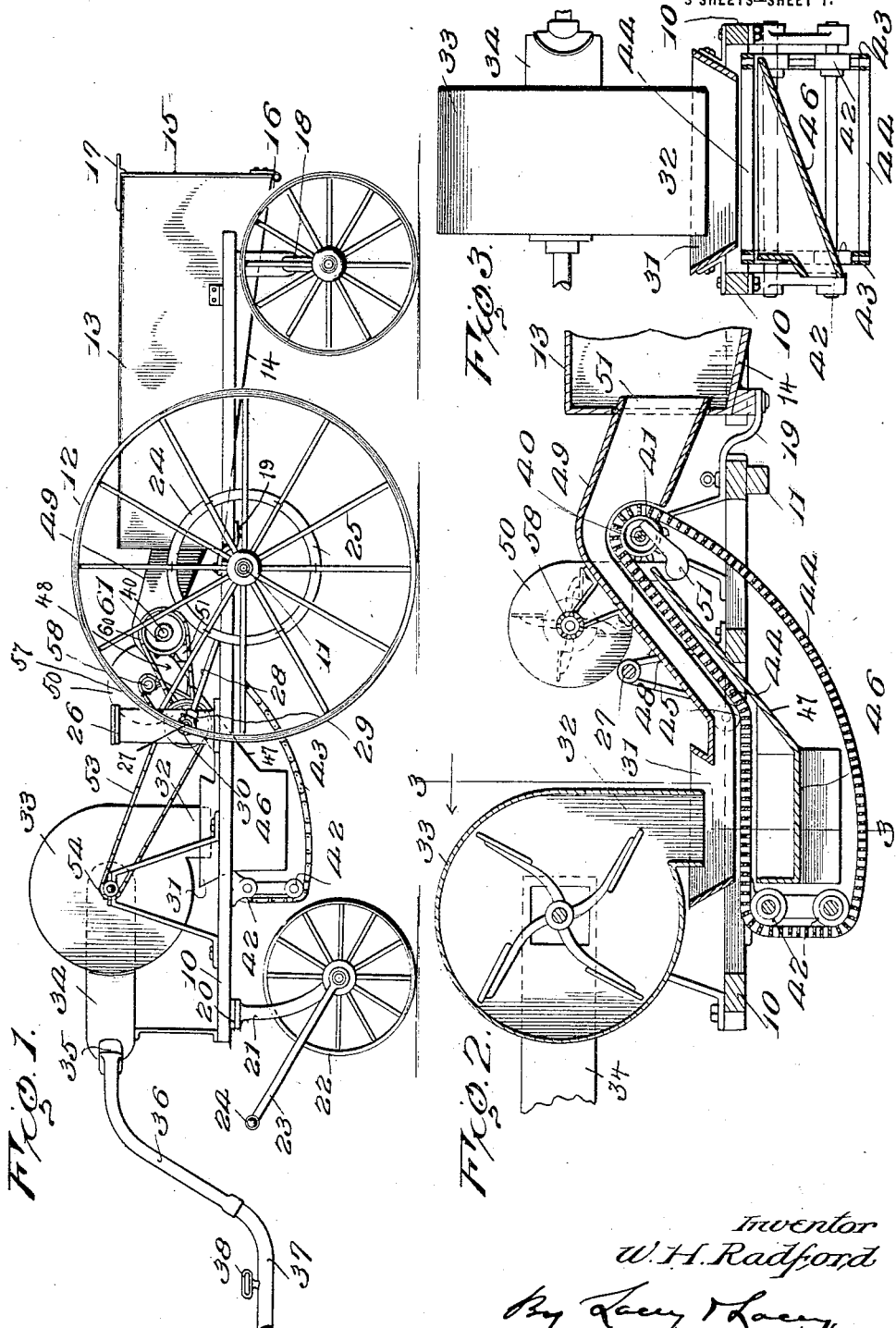

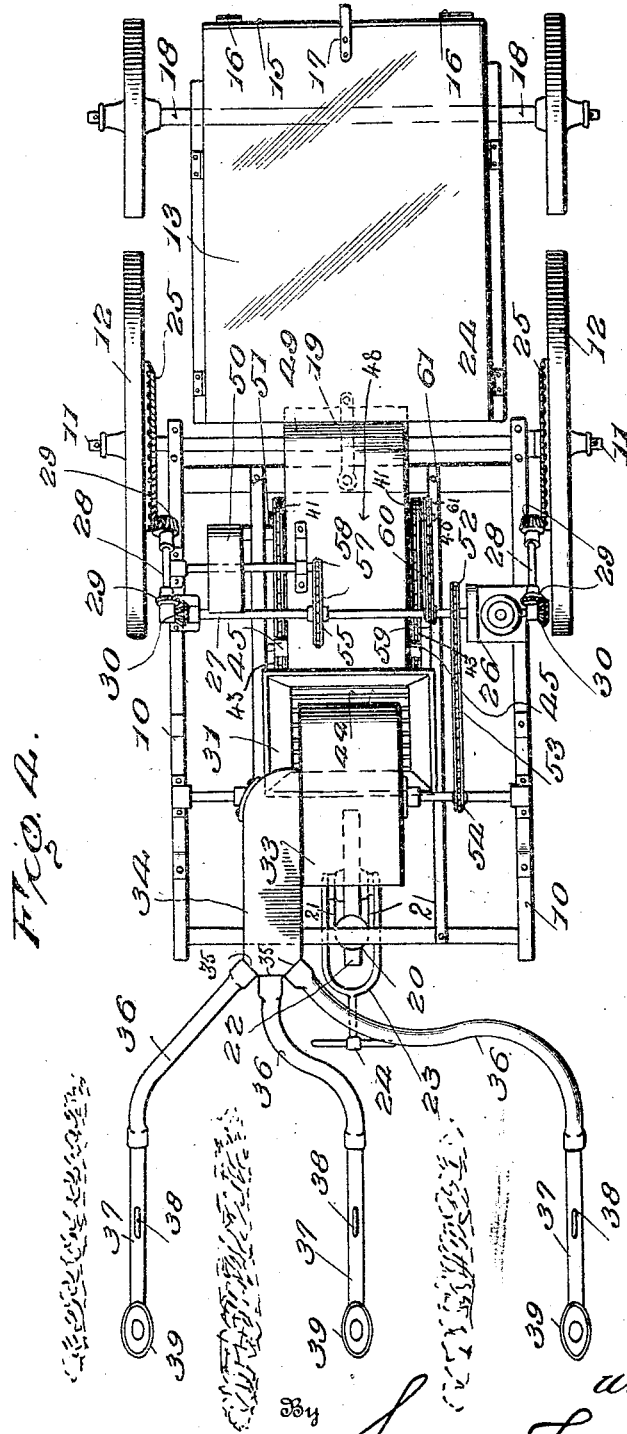

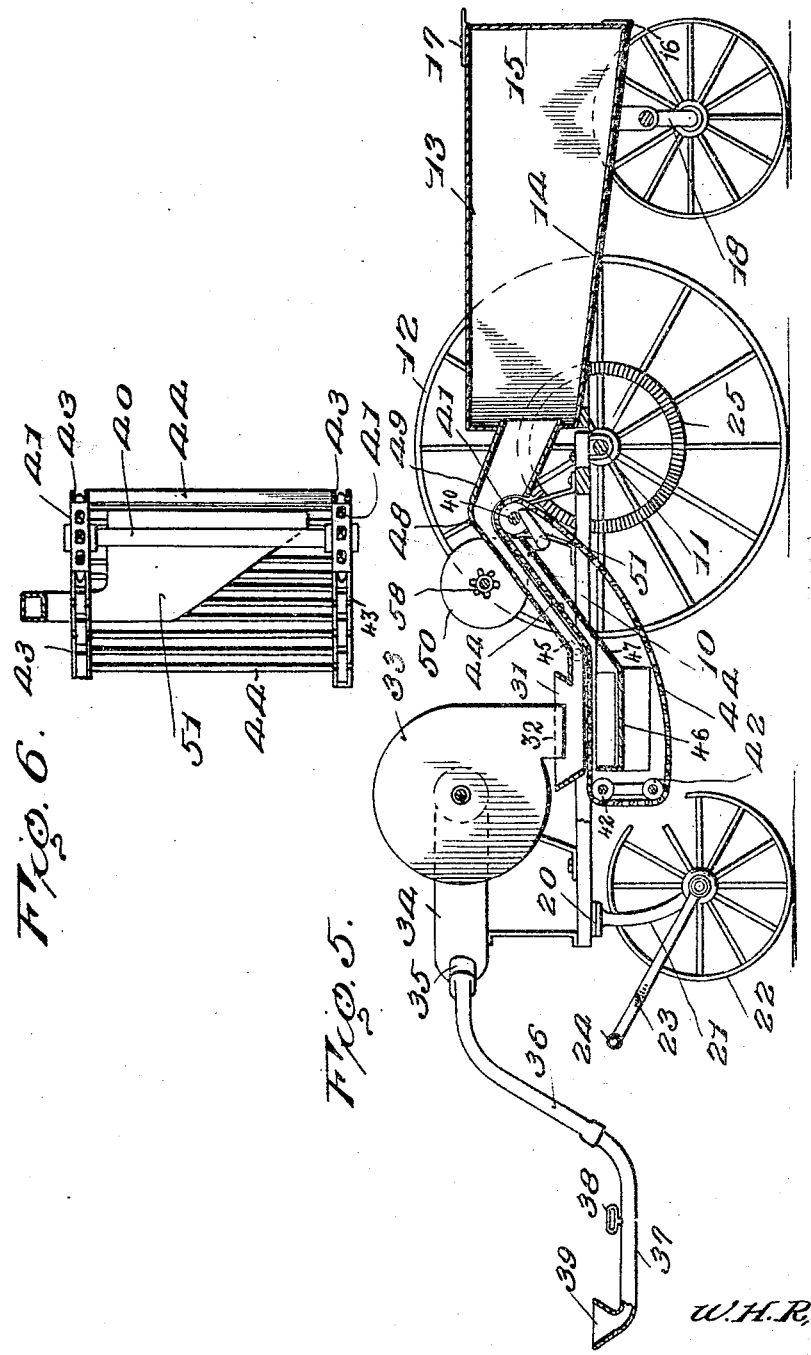

WILL H. RADFORD, OF KENEDY, TEXAS.

PNEUMATIC COTTON-PICKER.

1,287,433.　　　　Specification of Letters Patent.　　Patented Dec. 10, 1918.

Application filed April 23, 1918.　Serial No. 230,301.

*To all whom it may concern:*

Be it known that I, WILL H. RADFORD, a citizen of the United States, residing at Kenedy, in the county of Karnes and State of Texas, have invented certain new and useful Improvements in Pneumatic Cotton-Pickers, of which the following is a specification.

This invention relates to improvements in pneumatic cotton pickers, and has for one of its objects to improve the construction and increase the efficiency and utility of devices of this character.

Another object of the invention is to provide a device of this character in which provision is made for picking the bolls of cotton from beneath, thereby avoiding the tendency of the picker to draw leaves, the branches of weeds and the like into the conductor members or pickers.

Another object of the invention is to provide a device of this character adapted to pick the bolls of cotton simultaneously from a plurality of rows of plants.

Another object of the invention is to provide a device of this character in which provision is made for separating foreign matter from the cotton on its passage from the picker devices to a receptacle.

With these and other objects in view, the invention consists in certain novel features of construction, as hereinafter shown and described and then specifically pointed out in the claims; and in the drawings illustrative of the preferred embodiment of the invention—

Figure 1 is a side elevation of the improved apparatus,

Fig. 2 is an enlarged sectional detail illustrating the construction of the combined conveyer and separator, Fig. 3 is a section on the line 3—3 of Fig. 2 looking in the direction of the arrow, Fig. 4 is a plan view of the improved apparatus, Fig. 5 is a side elevation with portions in section on the line 5—5 of Fig. 4, Fig. 6 is an enlarged sectional detail illustrating the operation of the blast fan for clearing the conveyer belt.

The improved device comprises a supporting platform or frame mounted upon carrier wheels, an operating motor, for instance a gasolene engine, carried upon the platform or frame and adapted to operate the traction wheels, and the picking and elevating mechanism associated with the improved apparatus. The frame is of sufficient width to bear over a plurality of rows of cotton plants, for instance two, with the picking elements adapted to be engaged with all of the cotton upon two full rows and pick the cotton from one side of two other rows of the plants, but it is not desired to limit the improved apparatus to any specific numbers of the rows. The improved apparatus likewise includes a main suction fan or like device, a plurality of tubular "pickers" flexibly coupled to the fan suction and adapted to operate upon the cotton of a plurality of the rows of plants, a combined elevating and screening device to receive the gathered cotton from the suction fan and convey them to a suitable receptacle, and a smaller blast fan to accelerate the passage of the cotton into the receptacle and also to prevent it from clinging to the elevating medium. The elevating apparatus is also arranged to operate as a screen or separator to permit the escape of foreign matter which may be carried through the fan with the cotton and prevent such material being conveyed to the receptacle.

For the purpose of illustration an operative apparatus is shown comprising a supporting platform or frame 10 of any suitable construction or material and carrying a main axle 11 having traction wheels 12.

Associated with the frame 10 is a relatively large receptacle 13, preferably with an inclined floor or bottom 14 to facilitate the discharge of the gathered cotton through a rear door or closure 15 hingedly supported at its lower end as shown at 16 and with a suitable catch 17 at the upper end. By this means the gathered cotton may be readily discharged from the receptacle.

The receptacle 13 is mounted upon an axle 18, preferably bowed to enable it to pass over the cotton plants, and coupled at 19 to one of the transverse members of the frame 10. By this means the receptacle is caused to "trail" behind the frame 10.

Pivoted at 20 to the platform 10 is a yoke device 21 carrying a steering wheel 22. The yoke 21 is provided with a steering handle 23 terminating in a hand grip member 24. By this means the supporting platform may be manually guided.

The axle 11 carries relatively large traction wheels. Each of the traction wheels 12 is provided with an annular gear member 25. Mounted upon the platform 10 is a suitable motor, preferably gasolene driven, and represented conventionally at 26. The main shaft 27 of the motor extends entirely across the platform 10 and is coupled to drive counter shafts 28 provided with beveled pinions 29, the pinions 29 being connected respectively to the gears 25 and a beveled pinion 30 on the motor shaft. By this means it will be obvious that the traction wheels 12 will be operated from the motor, and move the platform with the mechanism supported thereon forwardly, and carry the receptacle 13 with it.

Mounted upon the platform 10 is a relatively small receptacle 31, preferably hopper shaped, and into which the discharge trunk 32 of a relatively large fan casing 33 terminates as shown. The intake portion of the fan is in the form of a relatively large tubular member 34 having a plurality of coupling members 35 with which a plurality of sections 36 of hose are coupled. Connected to the outer end of each hose section is a metal tubular member or conductor 37, each provided with a supporting handle 38 and terminating respectively in upwardly opening funnel shaped devices 39. The terminals 39 constitute the "picker" devices of the apparatus, as hereafter more fully explained.

Suitably supported from the platform 10 is a shaft 40 carrying chain wheels 41, while idler rollers 42 are supported from the platform 10 in advance of the hopper 31.

Endless chains 43 operate around the chain pulleys 41 and the idler rollers 42, the pulleys and idlers being spaced a considerable distance apart upon their respective shafts, and the discharge of the hopper 31 falls within the lines of the chains. The chains 43 are coupled by slats or bars 44, spaced at slight intervals, and adapted to operate as an endless slatted belt to screen or separate foreign matter from the cotton after being picked. Other idler or bearing pulleys 45 are supported from the main platform members 10 and engage the chains 43 from above so that the portions of the chains and the slats which pass beneath the hopper 31 operate in a horizontal position as illustrated in Figs. 2 and 5. The slats 44 are thus caused to pass horizontally beneath the hopper 31 and thence upwardly and rearwardly.

The rollers 42 are spaced vertically for a considerable distance so that the lower part of the slatted belt travels during its return for a corresponding distance below the upper part, thus providing space for a laterally discharging chute 46, and gather board 47. A shield or casing 48 is supported above the upwardly traveling portion of the slatted belt as illustrated more fully in Fig. 2, and merges into a downwardly inclined discharge trunk or spout 49 leading into the receptacle 13. By this arrangement relatively strong currents of air will be drawn through the picker devices 39 by the action of the fan 33 and conducted through the tubular members 37 into the fan casing 33 and thence discharged into the hopper 31 and upon the slats 44 and conducted thence through the trunk 48—49 into the receptacle 13. The currents generated by the fan 33 cause the cotton to be separated from the plants without injury thereto, and will be of sufficient strength to remove the cotton from the pods when the picker devices 39 are disposed beneath them. A relatively small blast fan represented conventionally at 50 is located upon the frame 10, with its discharge 51 leading into the space between the runs of the chain 43, as shown more clearly in Fig. 2. By this arrangement the discharge of the cotton from the slatted belt is accelerated, and prevented from clinging to the slats and the positive discharge from the trunk 49 into the receptacle assured.

The shaft 27 of the motor 26 is provided with a chain wheel 52 from which a drive chain 53 leads to a chain pinion 54 on the shaft of the fan 33, while a similar chain wheel 55 is carried by the shaft 27 and from which a chain 57 leads to a chain pinion 58 on the shaft of the blast fan 50. The shaft 27 is likewise provided with a chain pinion 59 over which a chain 60 leads to a relatively large chain wheel 61 on the shaft 40 of the slatted belt. By means of the traction wheels 12, both of the fans, and the slatted belt, are operated from the single shaft 27 of the motor, and at the requisite speeds.

Having thus described the invention, what is claimed as new is:

1. A cotton picker including a receptacle, a casing having one end thereof communicating with the interior of the receptacle and having its other end provided with a hopper, an endless conveyer operating within the casing beneath the hopper, means for delivering cotton into the hopper, a discharge chute extending laterally of the conveyer beneath the hopper and provided with an upwardly inclined gather board disposed between the runs of the conveyer, and means for directing a current of air through the conveyer at the discharge end thereof.

2. A cotton picker including a wheeled truck, a trailer detachably secured to the truck and having a receptacle mounted thereon, a casing carried by the truck and having one end thereof inclined downwardly and communicating with the interior of the receptacle and its other end provided with a hopper, an endless slatted conveyer operating within the casing beneath the hopper, means for delivering cotton into the hopper, a transverse discharge chute interposed between the runs of the conveyer and provided with an upwardly inclined gather board, and a fan mounted on the truck at one side of the conveyer and provided with a laterally extending nozzle interposed between the runs of the conveyer at the discharge end thereof for directing a current of air through the conveyer in the direction of the receptacle.

3. A cotton picker including a wheeled truck, a receptacle carried by the truck, a casing having one end thereof communicating with the interior of the receptacle and its other end provided with a hopper, an endless conveyer operating within the casing beneath the hopper, means for delivering cotton into the hopper, a fan having a nozzle interposed between the runs of the conveyer at the discharge end thereof for directing a current of air through the conveyer, a motor mounted on the truck, and means for transmitting motion from the motor to the wheels of the truck and to said fan.

4. A cotton picker including a platform, a casing mounted on the platform and having one end thereof provided with a hopper and its other end inclined upwardly and thence downwardly to form a discharge spout, a receptacle communicating with the discharge spout, an endless conveyer mounted for rotation within the casing beneath the hopper and formed of spaced slats, means for delivering cotton into the hopper, a discharge chute arranged beneath the hopper and interposed between the runs of the conveyer, said discharge chute being provided with an upwardly inclined gather board, a fan casing having a nozzle extending between the runs of the conveyer at the discharge spout of the casing, and a fan operating within the fan casing for directing a current of air from the nozzle through the conveyer.

In testimony whereof I affix my signature.

WILL H. RADFORD. [L. s.]

Copies of this patent may be obtained for five cents each, by addressing the "Commissioner of Patents, Washington, D. C."